US008606857B2

(12) United States Patent
Stevens et al.

(10) Patent No.: US 8,606,857 B2
(45) Date of Patent: Dec. 10, 2013

(54) COOPERATIVE NEIGHBORING HARDWARE NODES DETERMINATION

(75) Inventors: Mark B. Stevens, Austin, TX (US); John D. Wilson, Houston, TX (US)

(73) Assignee: International Business Machines Corporation, Armonk, NY (US)

( * ) Notice: Subject to any disclaimer, the term of this patent is extended or adjusted under 35 U.S.C. 154(b) by 432 days.

(21) Appl. No.: 12/953,284

(22) Filed: Nov. 23, 2010

(65) Prior Publication Data

US 2012/0131175 A1    May 24, 2012

(51) Int. Cl.
*G06F 15/16* (2006.01)

(52) U.S. Cl.
USPC ........ 709/204; 709/205; 709/220; 456/404.2; 456/456.1

(58) Field of Classification Search
USPC .................. 709/204, 205, 220, 222, 223; 455/404.2, 456.1
See application file for complete search history.

(56) References Cited

U.S. PATENT DOCUMENTS

| 6,993,538 | B2 | 1/2006 | Gray |
| 7,187,906 | B2 | 3/2007 | Mason, Jr. et al. |
| 7,305,417 | B2 | 12/2007 | Gray |
| 7,327,998 | B2 | 2/2008 | Kumar et al. |
| 2005/0086300 | A1* | 4/2005 | Yeager et al. ................. 709/204 |
| 2007/0067310 | A1* | 3/2007 | Gupta et al. ..................... 707/10 |
| 2008/0212492 | A1* | 9/2008 | Harchol-Balter et al. .... 370/254 |

FOREIGN PATENT DOCUMENTS

WO    2008110460 A2    9/2008

OTHER PUBLICATIONS

George Exarchakos; Semantic Cooperation and Node Sharing Among P2P Networks; Proceedings of the Sixth International Network Conference (Inc 2006), Plymouth, UK; University of Plymouth, UK, 2006.
Shih-Hao Shen et al., "A cross-layer design for heterogeneous routing in wireless mesh networks," International Journal of Pervasive Computing and Communications, vol. 4, No. 1, pp. 40-49, 2008.

* cited by examiner

*Primary Examiner* — Ian N Moore
*Assistant Examiner* — Hien Nguyen
(74) *Attorney, Agent, or Firm* — Steven L. Bennett (57) ABSTRACT

A hardware node locates one or more neighboring hardware nodes. The hardware node maintains a general list of the neighboring hardware nodes. The hardware node can determine one or more selected neighboring hardware nodes within the general list with which the hardware node is interested in cooperating, such as to create an interest list of the selected neighboring hardware nodes. The hardware node contacts each selected neighboring hardware node, such as each node within the interest list, to determine a corresponding level of cooperation of each selected neighboring hardware node. The hardware node generates a cooperating list that includes the corresponding level of cooperation of each selected neighboring hardware node, after contacting each selected neighboring hardware node.

14 Claims, 3 Drawing Sheets

COOPERATIVE NEIGHBORING HARDWARE NODES DETERMINATION

BACKGROUND

With the advent of modern electronics, there exist distributed collections of devices, sensors, embedded systems, processors, and other types of what are referred to herein as hardware nodes. A hardware node may have an intrinsic reason for "being" just as to itself, such as to perform a given function. For example, a global positioning system (GPS) device can be considered a hardware node that performs GPS functionality such as mapping and routing.

SUMMARY OF THE INVENTION

A method of an embodiment of the invention includes locating, by a hardware node, one or more neighboring hardware nodes. The method includes maintaining, by the hardware node, a general list of the neighboring hardware nodes. The method includes contacting, by the hardware node, one or more selected neighboring hardware nodes within the general list of the neighboring hardware nodes to determine a corresponding level of cooperation of each selected neighboring hardware node. The method includes generating a cooperating list by the hardware node after contacting each selected neighboring hardware node. The cooperating list includes the corresponding level of cooperation of each selected neighboring hardware node.

A non-transitory computer-readable data storage medium of an embodiment of the invention stores computer-executable code that is executable by a hardware node to perform a method. The method includes locating one or more neighboring hardware nodes, and maintaining a general list of the neighboring hardware nodes. The method includes determining one or more selected neighboring hardware nodes within the general list with which the hardware node is interested in cooperating. The method includes contacting each selected neighboring hardware node to determine a corresponding level of cooperation of each selected neighboring hardware node. The method includes generating a cooperating list after contacting each selected neighboring hardware node. The cooperating list includes the corresponding level of cooperation of each selected neighboring hardware node.

A hardware node of an embodiment of the invention includes a hardware communication mechanism to communicate with one or more neighboring hardware nodes. The hardware node includes a computer-readable data storage medium to store a general list of the neighboring hardware nodes, and to store a cooperating list of one or more selected neighboring hardware nodes with which the hardware node is interested in cooperating. The hardware node includes first logic to locate the neighboring hardware nodes using the hardware communication mechanism and to responsively create the general list. The hardware node also includes second logic to determine the selected neighboring hardware nodes from the general list. The second logic is further to contact each selected neighboring hardware node using the hardware communication mechanism to determine a corresponding level of cooperation of each selected neighboring hardware node. The second logic is further to responsively generate the cooperating list such that the corresponding level of cooperation of each selected neighboring hardware node is stored within the cooperating list.

BRIEF DESCRIPTION OF THE SEVERAL VIEWS OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the embodiment of the invention is defined only by the appended claims.

As noted in the background section, distributed collections of devices, sensors, embedded sensors, processors, and other types of hardware nodes exist that may each have an intrinsic reason for "being" just as to itself. However, having these hardware nodes cooperate with one another to perform a distributed function has proven to be significantly more difficult. For example, while a global positioning system (GPS) device can perform GPS functionality as to a given vehicle, combining such GPS functionality of multiple GPS devices of multiple vehicles can enable other, distributed functionality, such as tracking a convey of such vehicles as a single unit.

Existing prior art in this respect includes smart devices, such as mobile phones, laptops, and other types of hardware nodes, that have the requisite memory, processing capability, and communication capability to communicate with other nodes. However, such smart devices are not intrinsically able to cooperate with one another to perform a distributed function. Existing mesh networking technology, such as mesh networking technology available under the Bluetooth® trademark owned and registered by Bluetooth SIG, Inc., permits networks of nodes to be created, reconfigured, and destroyed dynamically without a central router or other controller. However, such existing mesh networking technology does not include the nodes cooperating with one another to perform a given function.

Other existing prior art includes Agilla middleware technology, which runs over wireless sensor networks so that nodes can communicate with one another to perform a function. However, this type of middleware technology does not provide for the nodes to know the nodes that are members of a network. As such, a given node cannot initiate a function to be performed by the network based on what types of nodes are present within the network, limiting the utility of this existing approach. Similarly, Gnutella peer-to-peer networking technology permits nodes to communicate with one another without a central controller, but because there is no definition as to the membership of the network, its utility is limited.

Still other existing prior art includes BitTorrent file-sharing technology. This technology does permit the membership of the network to be known. However, the membership is maintained by a central controller, commonly called a tracker system. As such, ad-hoc peer-to-peer networks cannot be created without such a central controller. The controller also acts as a single point of failure within the network, further limiting the robustness of this type of technology.

In light of the above approaches, a previously filed, co-assigned, and co-invented patent application entitled "Temporary collaborative ad-hoc network of hardware nodes to perform function," filed on Nov. 23, 2010, and assigned Ser. No. 12/953,222, permits a temporary ad-hoc network of heterogeneous or homogeneous hardware nodes to be created. This patent application uses prior art such as smart devices and mesh networking technology like that available under the Bluetooth® trademark as lower-level enabling technology on top of which its disclosed embodiments can be implemented. The network is ad-hoc in the sense that it is a peer-to-peer network, which does not require a central controller to management membership. At the same time, however, each hardware node within the network has a list of the hardware nodes that are members of the network, to a degree of desired correctness.

As such, a given node as disclosed in the referenced patent application can initiate a function to be performed by the network based on what types of nodes are present within the network. The network itself can be dynamically created, modified, and destroyed without the need for a central controller. The referenced patent application discloses how such a temporary collaborative network is created; how a hardware node performs roll call to update its understanding of the other nodes that are members of the network; and to what extent a hardware node has to have a correct understanding of which other nodes that are members of the network.

However, the referenced patent application does not describe how a hardware node can determine cooperative neighboring hardware nodes with which the hardware node can potentially form a temporary collaborative ad-hoc network. Disclosed herein, by comparison, are approaches for determining such cooperative neighboring hardware nodes. In general, a hardware node locates one or more neighboring hardware nodes, and maintains a general list of these neighboring hardware nodes. The hardware node then determines one or more selected neighboring hardware nodes within this general list, and with which the hardware node is interested is cooperating. The hardware node contacts each selected neighboring hardware node to determine a corresponding level of cooperation of each such node. These corresponding levels of cooperation of the selected neighboring hardware nodes are then stored within a cooperating list.

As such, the hardware node can create a temporary collaborative ad-hoc network (including itself) with one or more particular nodes within the cooperating list, based on the corresponding levels of cooperation of the hardware nodes maintained within this list. A given function can then be performed by this network. By determining which hardware nodes are neighboring to a hardware node, and by determining the level of cooperation of each such node with which the hardware node is interested in cooperating, the hardware node can therefore ultimately cause an appropriate temporary collaborative ad-hoc network to be created to perform a desired function. As with the referenced patent application, this patent application uses prior art such as smart devices and mesh networking technology like that available under the Bluetooth® trademark as lower-level enabling technology on top of which its disclosed embodiments can be implemented.

The description of embodiments of the invention that follows is organized in the following manner. First, a method as to how cooperative neighboring hardware nodes are determined by a hardware node is described. Second, illustrative examples of such cooperative neighboring hardware nodes determination are provided in a non-limiting manner, to convey a sense for how embodiments of the invention can be used. Third, representative systems and nodes are described to conclude the detailed description.

Figure 1:
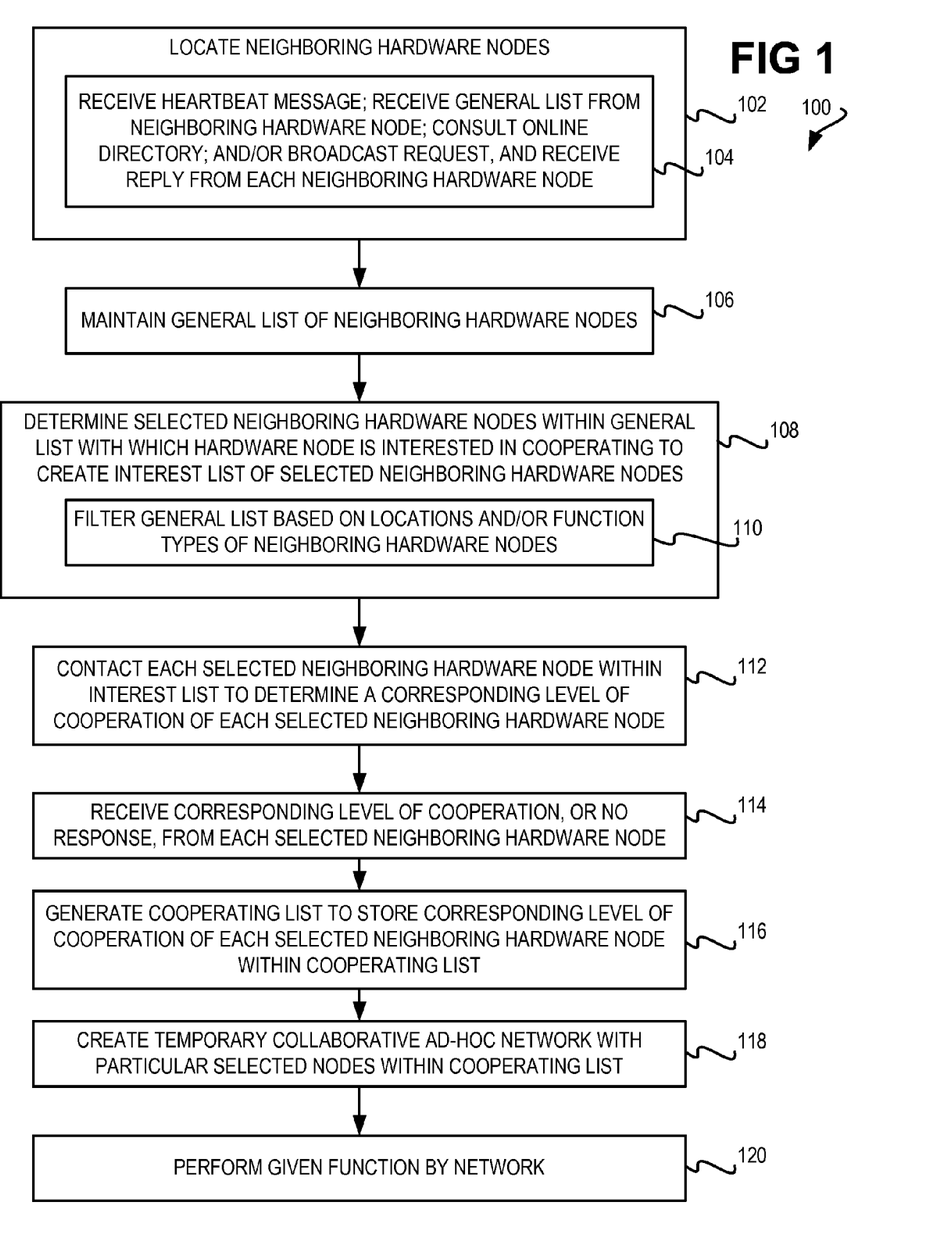
FIG. 1 is a flowchart of a method regarding a hardware node determining cooperative neighboring hardware nodes, according to an embodiment of the invention.

FIG. 1 shows a method 100, according to an embodiment of the invention. The method 100 is performed by a hardware node, in relation to other hardware nodes. The method 100, for instance, may be implemented as a computer program, stored on a non-transitory computer-readable data storage medium, for execution by the hardware node. The hardware nodes can be heterogeneous or homogeneous. Examples of hardware nodes include sensors, embedded sensors, processors, and other types of hardware nodes, such as hardware devices like mobile phones, other types of mobile devices, computing devices like desktop and laptop computers, and so on.

The hardware node locates neighboring hardware nodes (104). A neighboring hardware node is a hardware node with which the hardware node performing the method 100 has at least indirect communication. Four exemplary approaches by which the hardware node can locate neighboring hardware nodes are described herein (104), although other approaches can also be employed. First, hardware nodes may periodically broadcast heartbeat messages. As such, the hardware node performing the method 100 can listen for these heartbeat messages for a period of time to locate neighboring hardware nodes. The heartbeat messages that the hardware node performing the method 100 receives thus indicate the neighboring hardware nodes with which this hardware node has direct communication.

Second, the hardware node performing the method 100 may receive a list of neighboring hardware nodes from another hardware node. The hardware node performing the method 100 has direct communication with the hardware node from which it received the list, but may not have direct communication with the hardware nodes within the list. However, through the hardware node from which the list was received—and/or one or more other hardware nodes—the hardware node performing the method 100 may still be able to communicate with these hardware nodes on the list, in an indirect manner.

Third, the hardware node performing the method 100 may consult an online directory of hardware nodes to locate neighboring hardware nodes that are within direct and/or indirect communication range. For instance, each hardware node may periodically update its current position with an online directory, which the hardware node performing the method 100 can query to locate neighboring hardware nodes. In the context of devices such as smart mobile phones, this online directory may be maintained by a social networking web site.

Fourth, the hardware node performing the method 100 may broadcast a request for neighboring hardware nodes. Hardware nodes that are within direct communication range may send a reply back to this hardware node. As such, the hardware node performing the method 100 locates its neighboring hardware nodes as those hardware nodes from which it received replies.

These approaches can further be combined to locate neighboring hardware nodes. For instance, the hardware node performing the method 100 may consult an online directory of hardware nodes to locate neighboring hardware nodes while at the same time broadcasting a request for neighboring hardware nodes, and while also listening for heartbeat messages from neighboring hardware nodes. For each such neighboring hardware node with which the hardware node performing the method 100 has direct communication, a general list of other neighboring hardware nodes may then be received.

The hardware node performing the method 100 maintains a general list of the neighboring hardware nodes that it located in part 102 (106). It is noted that this general list differs from the general list that may have been received in part 104, in that the general list of part 106 is maintained at the hardware node performing the method 100. The general list includes the following information for each neighboring hardware node. First, an identifier that at least substantially uniquely identifies the neighboring hardware node is stored within the general list. Second, a location of the neighboring hardware node is stored within the general list. For instance, the latitude and/or longitude of the neighboring hardware may be stored.

Third, the general list includes a function type of the neighboring hardware node. The function type may be one of a different number of predetermined values in one embodiment, where each predetermined value corresponds to a different type of function. As one example, there may be eight possible different function types. As such, a single eight-bit byte can indicate which function type(s) a neighboring hardware node is by setting the bits appropriately for this hardware node within the general list.

Fourth, the general list may include further data regarding the neighboring hardware node, as to the function type of the hardware node. For example, the function type of a neighboring hardware node may indicate that the hardware node is a sensor. In the data part of the general list, further information regarding the sensing capability of the neighboring hardware node may be provided. For instance, the type of data that the sensor measures may be provided, including its units, how often the type of data is measured, and so on.

In one embodiment, the hardware node performing the method 100 can determine selected neighboring hardware nodes within the general list with which the hardware node is interesting in cooperating, to create a interest list of the selected neighboring hardware nodes (108). For instance, in one embodiment, the hardware node filters general list based on at least the locations and/or the function types of the neighboring hardware nodes (110). The neighboring hardware nodes that meet the provided criteria are assembled into the interest list.

The interest list differs from the general list, but is at least a subset of the general list maintained in part 106, in that each neighboring hardware node listed in the former is also listed in the latter, but not necessarily vice-versa. The interest list is a list of the neighboring hardware nodes that the hardware node performing the method 100 may wish to form a temporary collaborative ad-hoc network. By comparison, the general list is just a list of the neighboring hardware nodes of the hardware node performing the method 100, and each node within the general list may not be a hardware node with which the hardware node performing the method 100 wishes to form a network.

Furthermore, it is not guaranteed that the selected neighboring hardware nodes within the interest list will be available to form a network with the hardware node performing the method 100. For example, some of the selected neighboring hardware nodes may be too busy performing other tasks. As another example, some of the selected neighboring hardware nodes may have gone offline, or the hardware node performing the method 100 may otherwise be unable to communicate with these hardware nodes any longer.

The hardware node therefore contacts each selected neighboring hardware node within the interest list to determine a corresponding level of cooperation of each selected neighboring hardware node (112). In the message that the hardware node individually sends to each selected neighboring hardware node, the hardware node performing the method 100 indicates the type of cooperation it desires from the recipient hardware node. Different selected neighboring hardware nodes may thus have different types of cooperation that the hardware node performing the method 100 would like.

For example, the hardware node performing the method 100 may want to receive sensor information regarding some types of hardware nodes, and may want to be able to display calculations based on this sensor information to other types of hardware nodes. Therefore, the hardware node performing the method 100 requests that the former selected neighboring hardware nodes provide sensor data. Similarly, the hardware node requests that the latter selected neighboring hardware nodes be able to display provided information.

In response, the hardware node either receives from each selected neighboring hardware node a corresponding level of cooperation that the neighboring hardware node is willing to provide, or no response at all (114). In the latter case, this means that the hardware node performing the method 100 can no longer communicate with the selected neighboring hardware node in question. This selected neighboring hardware node may have failed, gone offline, or may have moved out of communication range from the hardware node performing the method 100.

By comparison, in the former case, the corresponding level of cooperation can include, in one embodiment, one or more of the following types of information. First, a selected neighboring hardware node can provide a list of one or more functions that it is willing to perform for or with the hardware node performing the method 100. It is noted that these functions may differ from the functions that hardware node performing the method 100 may have requested of the selected neighboring hardware node. For example, the hardware node performing the method 100 may have requested both temperature and humidity readings be provided every minute, whereas the selected neighboring hardware node may respond that it can only provide temperature readings every five minutes. As such, the process of parts 112 and 114 can be considered a negotiation process, where over a number of communications back and forth between the hardware node performing the method 100 and the selected neighboring hardware node, the level of cooperation between the two hardware nodes is established.

Similarly, second, a selected neighboring hardware node can provide an exchange by which the selected neighboring hardware node is willing to perform one or more functions for the hardware node performing the method 100 if the hardware node is willing to perform one or more other functions for the selected neighboring hardware node. For example, the hardware node performing the method 100 may have requested that temperature and humidity readings be provided periodically by the selected neighboring hardware node. In turn, the selected neighboring hardware node may respond that it is willing to provide these readings, if the hardware node performing the method 100 calculates the heat index based on the readings and sends the calculated values to the selected neighboring hardware node.

Third, a selected neighboring hardware node may respond that it is unwilling to provide any level of cooperation. This situation differs from the case where the selected neighboring hardware node does not respond to the request by the hardware node performing the method 100, even if the effect is similar. In the latter case, the hardware node does not receive a response back from the selected neighboring hardware node. The hardware node may thus conclude that the selected neighboring hardware node is out of communication range, offline, or has failed. By comparison, where the selected neighboring hardware node explicitly responds that it is unwilling to provide any level of cooperation, the hardware node knows that the selected node is still within communication range, is online, and has not failed, but that the node is unwilling to provide any cooperation. For example, the selected neighboring hardware node may be overloaded with cooperating with other hardware nodes.

Fourth, a selected neighboring hardware node may respond with a cost in a currency that it charges for performing the functions requested by the hardware node performing the method 100. For example, a selected neighboring hardware node may be an electronic billboard. If requested to provide display functionality, such as to display a given advertisement for a certain length of time, the selected neighboring hardware node may respond with the cost that will be incurred by the hardware node performing the method 100 if it desires the selected node to perform this functionality. The currency may be a nation's currency, such as dollars of the United States, as well as virtual currencies that do not generally have standing with governments, such as credits in the case of various social networking web sites.

The hardware node performing the method 100 responsively generates a cooperating list, in which the corresponding level of cooperation of each selected neighboring hardware node is stored (116). Where the hardware node does not receive a response from a particular selected neighboring hardware node, this information may be indicated within the cooperating list as the corresponding level of cooperation from the particular node. That is, the information may indicate that the particular selected neighboring hardware node is unresponsive. Alternatively, the hardware node may not include a reference to the particular select neighboring hardware node within the cooperating list.

The cooperating list is therefore at least a subset of the interest list. The cooperating list and the interest list differ. The interest list includes the selected neighboring hardware nodes of the general list with which the hardware node performing the method 100 is interested in cooperating. By comparison, the cooperating list includes the corresponding level of cooperation for at least a subset of the selected hardware nodes within the interest list, and this information is not part of the interest list. Selected neighboring nodes that are unresponsive may not be stored in the cooperating list, as noted above, or such unresponsive selected neighboring nodes may be stored in the cooperating list, but referenced in this list as being unresponsive.

Each of the cooperating list, the interest list, and the general list can be maintained by the hardware node performing the method 100 as a database in one embodiment, such as a flat-file or a relational database. There can be an entry, or row, for each neighboring hardware node, in the case of the general list, and for each selected neighboring hardware node, in the case of the cooperating list and the interest list. The columns of the database correspond to the information maintained in the databases. For instance, the general list can include columns for identifier, location, function type, and additional data regarding function type. In one embodiment, the cooperating list and the interest list can include these same columns, where the cooperating list also includes one or more columns for corresponding level of cooperation. Alternatively, the cooperating and the interest list may have just a column for identifier, where the cooperating list also includes one or more columns for corresponding level of cooperation. In this latter embodiment, the other information is retrieved by relating the cooperating list and the interest list with the general list.

The hardware node performing the method 100 can then create a temporary collaborative ad-hoc network with one or more particular selected neighboring hardware nodes within the cooperating list (118). For example, based on the corresponding level of cooperation of each selected neighboring hardware node within the cooperating list, the hardware node may further choose one or more of these selected nodes with which to form a network, which are referred to herein as particular selected neighboring hardware nodes. The temporary collaborative ad-hoc network may be formed as is described in the previously referenced patent application. As such, the temporary collaborative ad-hoc network ultimately performs a given function (120), as is also described in detail in the previously referenced patent application.

The method 100 that has been described represents a culling process. Of all the hardware nodes, the hardware node performing the method 100 locates neighboring hardware nodes in part 102, and maintains a general list of these neighboring nodes in part 106. Of all the neighboring hardware nodes within the general list, the hardware node performing the method 100 then selects one or more selected neighboring nodes and creates an interest list thereof in part 108. Of all the selected neighboring nodes within the cooperating list, the hardware node performing the method 100 receives corresponding levels of cooperation to generate a cooperating list in part 116 that may have fewer nodes than the interest list. The hardware node performing the method 100 finally chooses one or more particular selected nodes with which to create a temporary collaborative ad-hoc network, from the cooperating list, in part 118.

It is noted that a neighboring hardware node that cooperates with the hardware node performing the method 100 is not a cooperative node in the same sense as within the prior art. For example, a cooperating node in the context of mesh networking technology available under the Bluetooth® trademark is a node that can communicate with another node. By comparison, a cooperating neighboring hardware node is a node that both can communicate with the hardware node performing the method 100, and is willing to cooperate with this hardware node substantially as desired by the hardware node. That is, a neighboring hardware node can be a cooperating node in the context of mesh networking technology in that it is able to communicate with the hardware node performing the method 100. However, such a neighboring hardware node may not be a cooperating node in the context of the method 100, insofar as even though it can communicate with the hardware node performing the method 100, the node may be unwilling to cooperate with the hardware node performing the method 100 as desired by the hardware node.

In this sense, it is reiterated that the method 100 is performed at a higher level than mesh networking technology, such as that available under the Bluetooth® trademark. Mesh networking technology is an enabling technology by which the hardware node performing the method 100 can communicate with neighboring hardware nodes. While such mesh networking technology may be employed to determine a general list of neighboring hardware nodes, the determination of an interest list of selected neighboring hardware nodes, and the potential further culling of this list to generate a cooperating list and to determine selected nodes with which a network is to be formed, are beyond the scope of such technology. That is, the determination of a cooperating list and the further culling of this list to determine selected nodes with which a network is to be formed occur at a higher level or layer than that which is provided by existing networking technology frameworks.

It is further noted that the method 100 provides for more cooperation among neighboring hardware nodes than that afforded by the prior art. In the prior art, as noted above, if two hardware nodes can communicate with one another, then they are assumed to be cooperative, which is not the case in the method 100. That is, in the method 100, two neighboring hardware nodes can communicate with one another, but not be cooperative with one another. Furthermore, two hardware nodes can be cooperative with one another to a degree other than full cooperation. For example, a first hardware node may request that a second hardware node provide temperature readings every minute. However, the second hardware node may only be willing to provide such readings every five minutes. In this case, there is still cooperation between the two hardware nodes, albeit not full cooperation to the extent that the first hardware node had desired.

Two examples are now provided to provide a sense for how the method 100 can be used to provide functionality that no individual hardware node can itself perform. In a first example, a number of hardware nodes may be sensors that may be located on the floor of a conference center, and which may correspond to various exhibition booths located on the floor. Another hardware node may be a badge that a participant wears. A tracking hardware node may be interested in tracking the participant's path through the conference center floor, as well as how much time the participant spends at each exhibition booth. There may be other hardware nodes related to tracking temperature, humidity, and other environmental characteristics on the floor.

The tracking hardware node may therefore determine that it is able to communicate with all the other hardware nodes. However, it is just interested in communicating with the hardware nodes that are sensors. The tracking hardware node may request that each time a sensor detects the presence of the badge that the participant is wearing, the sensor should inform the tracking hardware node. Some of the sensors may oblige willingly, and other sensors may indicate that it will provide this information only if the tracking hardware node in return provides the information that it is collecting from the other sensors as well.

A corresponding temporary collaborative ad-hoc network is thus created between the sensors and the tracking hardware node. As the participant walks from exhibition booth to exhibition booth, then, the sensors detect the participant's badge, and correspondingly inform the tracking hardware node. The time difference between a first sensor detecting the badge and a second sensor detecting the badge is determined by the tracking hardware node as a rough estimate of the time that the participant spent at the exhibition booth at which the first sensor is located. As the path of the participant is determined, and as the time spent by the participant at each booth is tracked, the tracking hardware node may send this information to the sensors that had requested this information as the condition to which these sensors would indicate to the tracking hardware node that they detected the badge.

In a second example, a number of hardware nodes may be display devices of different types. Another hardware node may be an advertising hardware node that would like to display information to consumers. A third type of hardware node may be a payment hardware node that is able to settle payments between accounts. The advertising hardware node may locate the display devices and the payment hardware node, as neighboring hardware nodes. In response, the advertising hardware node determines the display devices with which it would like to display information, and requests the payment terms of these devices for displaying the information. The advertising hardware node may then select a number of the display devices based on such payment terms, and arrange with the payment hardware node to pay the accounts of the owners or operators of the display devices in question responsive to these display devices displaying the information.

Figure 2:
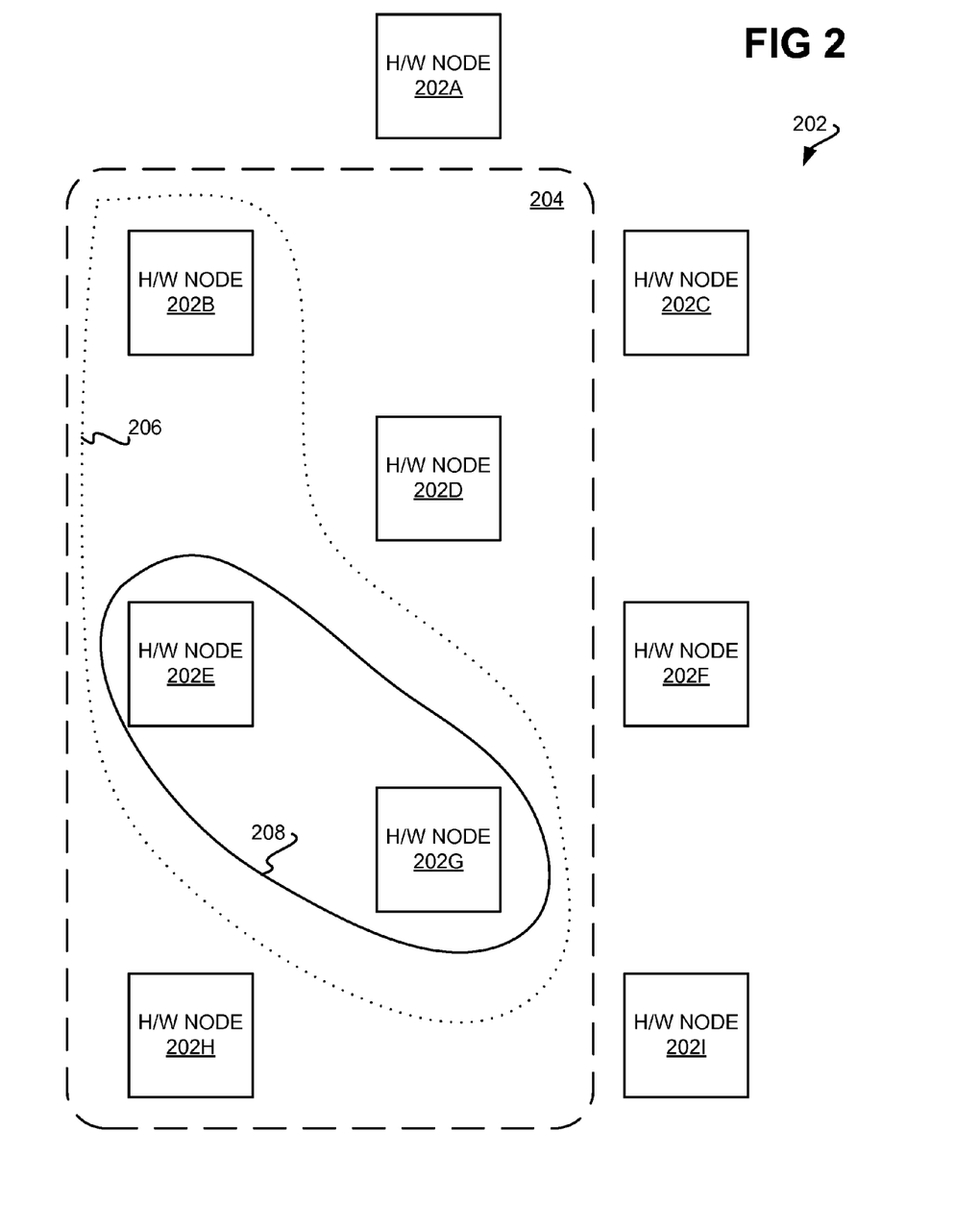
FIG. 2 is a diagram of a system of hardware nodes, according to an embodiment of the invention.

FIG. 2 shows a representative system 200, according to an embodiment of the invention. The system 200 includes nine hardware nodes 202A, 202B, 202C, 202E, 202F, 202G, 202H, and 202I, collectively referred to as the hardware nodes 202. The hardware nodes 202 can be of similar, identical, or different types. In the example of FIG. 2, it is assumed that the hardware node 202E is performing the method 100.

The hardware node 202E determines which of the other hardware nodes 202 are neighboring hardware nodes. In the example of FIG. 2, this is represented by the dashed line 204. That is, the hardware node 202E can communicate with the hardware nodes 202B, 202D, 202G, and 202H, but not with the hardware nodes 202A, 202C, 202F, and 202I. Therefore, the general list maintained by the hardware node 202E includes its neighboring hardware nodes 202B, 202D, 202G, and 202H.

In the example of FIG. 2, the hardware node 202E then determines it wishes to cooperate with the hardware nodes 202B and 202G. This is represented by the dotted line 206. That is, the hardware node 202E determines that of its neighboring hardware nodes 202B, 202D, 202G, and 202H within the general list, the hardware nodes 202B and 202G are selected to be part of the interest list of the hardware node 202E in one embodiment. The hardware node 202E therefore requests a desired level of cooperation with each of the selected neighboring hardware nodes 202B and 202G.

Based on the responses from the selected neighboring hardware nodes 202B and 202G, the hardware node 202E generates a corresponding cooperating list. Furthermore, in the example of FIG. 2 may determine that it will attempt to form a temporary collaborative ad-hoc network just with the hardware node 202G. This is represented by the solid line 208. For instance, the hardware node 202B may not have responded to the request from the hardware node 202E, or the hardware node 202B may be unwilling to cooperate with the hardware node 202E. As such, ultimately the hardware node 202E attempts to form a temporary collaborative ad-hoc network just with the hardware node 202G.

Figure 3:
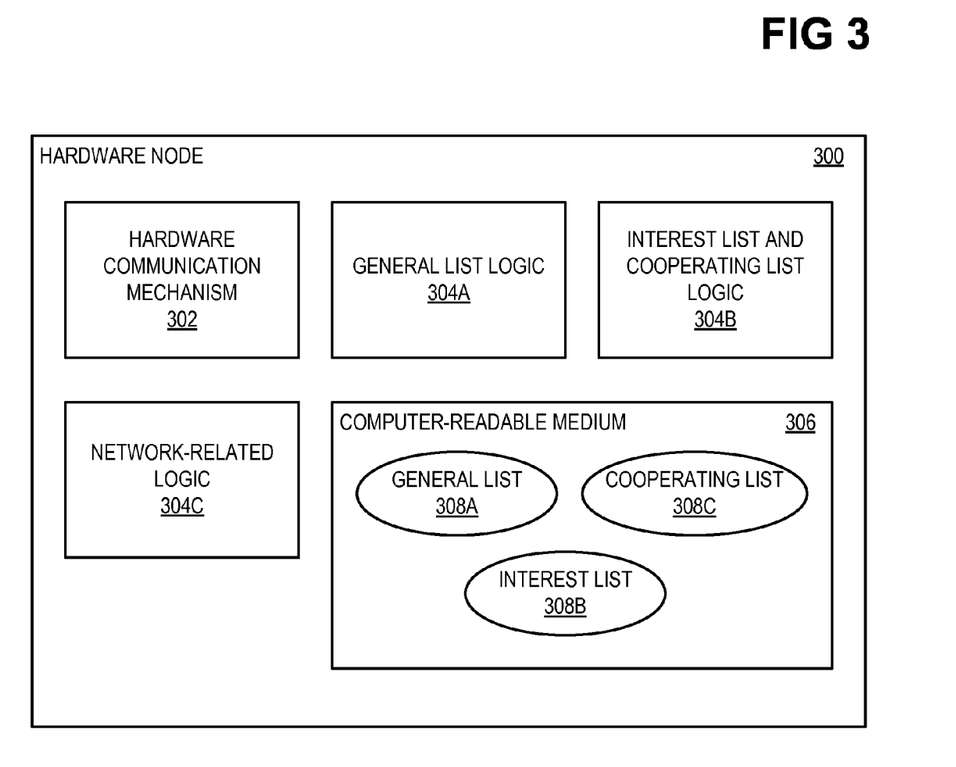
FIG. 3 is a diagram of a representative hardware node, according to an embodiment of the invention.

In conclusion, FIG. 3 shows a rudimentary hardware node 300, according to an embodiment of the invention. The hardware node 300 includes a hardware communication mechanism 302, as well as three types of logic 304A, 304B, and 304C, collectively referred to as the logic 304, and a non-transitory computer-readable data storage medium 306. Each of the logic 304 can be implemented directly in hardware, or as software that is stored on the non-transitory computer-readable data storage medium 306 and that is then executed by a processor of the hardware node 300, where such a processor is not depicted in FIG. 3.

The hardware communication mechanism 302 includes the hardware necessary to perform node-to-node communication in accordance with one or more networking topologies. Such networking topologies can include wired as well as wireless networking topologies. The non-transitory computer-readable data storage medium 306 stores data representing a general list 308A, an interest list 308B, and a cooperating list 308C, which are collectively referred to as the lists 308.

The general list logic 304A performs parts 102 and 106 of the method 100, and as such maintains the general list 308A of neighboring hardware nodes. The interest list and cooperating list logic 304B performs parts 108, 112, 114, and 116 of the method 100, and as such creates the interest list 308B and the cooperating list 308C of selected neighboring hardware nodes. The network-related logic 304C performs parts 118 and/or 120 of the method 100, and thus chooses one or more particular selected neighboring hardware nodes from the cooperating list 308C, and attempts to create a temporary collaborative ad-hoc network with these nodes. The network-related logic 304C, for instance, can include the logic that is described in the previously referenced patent application.

Finally, it is noted that, as can be appreciated by one those of ordinary skill within the art, aspects of the present invention may be embodied as a system, method or computer program product. Accordingly, aspects of the embodiments of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

In general, a computer program product includes a computer-readable medium on which one or more computer programs are stored. Execution of the computer programs from the computer-readable medium by one or more processors of one or more hardware devices causes a method to be performed. For instance, the method that is to be performed may be one or more of the methods that have been described above.

The computer programs themselves include computer program code. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is finally noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. As such and therefore, it is manifestly intended that this invention be limited only by the claims and equivalents thereof.

We claim:

1. A method comprising:
    locating, by a hardware node, one or more neighboring hardware nodes;
    maintaining, by the hardware node, a general list of the neighboring hardware nodes, including, for each neighboring hardware node, storing an identifier, a location, and a function type of the neighboring hardware node;
    determining, by the hardware node, the one or more selected neighboring hardware nodes with which the hardware node is interested in cooperating based on a desired functionality of the selected neighboring hardware nodes, the one or more selected neighboring hardware nodes being within the general list of the neighboring hardware nodes, including filtering the general list of the neighboring hardware nodes to locate the selected neighboring hardware nodes based on one or more of the location and the function type of each neighboring hardware node;
    after maintaining the general list, generating an interest list by the hardware node, the interest list including the selected neighboring hardware nodes within the general list with which the hardware node is interested in cooperating, the interest list being a subset of the general list;
    contacting, by the hardware node, one or more selected neighboring hardware nodes within the interest list to determine a corresponding level of cooperation of each selected neighboring hardware node; and
    after generating the interest list, generating a cooperating list by the hardware node after contacting each selected neighboring hardware node, the cooperating list including the corresponding level of cooperation of each selected neighboring hardware node, the cooperating list being a subset of the interest list, the cooperating list including one or more particular selected neighboring hardware nodes that have the desired functionality and that are willing to perform the desired functionality for the hardware node.

2. The method of claim 1, further comprising:
    creating a temporary collaborative ad-hoc network including the hardware node and the particular selected hardware nodes within the cooperating list; and,
    performing a given function by the temporary collaborative ad-hoc network.

3. The method of claim 1, wherein locating the neighboring hardware nodes comprises receiving a heartbeat message broadcast from each neighboring hardware node, without the hardware node having first broadcast a request for reply by the neighboring hardware nodes.

4. The method of claim 1, wherein the general list of the neighboring hardware nodes is a first general list,
    and wherein locating the neighboring hardware nodes comprising receiving a second general list of the neighboring hardware nodes from a given neighboring hardware node.

5. The method of claim 1, wherein locating the neighboring hardware nodes comprises consulting an online directory of hardware nodes to determine which of the nodes within the online directory are the neighboring hardware nodes.

6. The method of claim 1, wherein locating the neighboring hardware nodes comprises:
    broadcasting a request for the neighboring hardware nodes, by the hardware node; and,
    receiving a reply from each neighboring hardware node.

7. The method of claim 1, wherein maintaining the general list of the neighboring hardware nodes further includes comprises, for each neighboring hardware node, storing additional data regarding the neighboring hardware node, the additional data related to the function type of the neighboring hardware node.

8. The method of claim 1, further comprising, after contacting each selected neighboring hardware node to determine the corresponding level of cooperation of each selected neighboring hardware node:
    receiving from a given selected neighboring hardware node the corresponding level of cooperation as one or more of:
        a list of one or more functions that the given selected neighboring hardware node is willing to perform for or with the hardware node;
        a cost in a currency that the given selected neighboring hardware unit is to charge for performing the functions;
        an exchange by which the given selected neighboring hardware unit is willing to perform the functions if the hardware node is willing to perform one or more other functions for the hardware node;
        that the given selected neighboring hardware node is unwilling to provide any level of cooperation.

9. The method of claim 1, wherein the method further comprises, after contacting each selected neighboring hardware node to determine the corresponding level of cooperation of each selected neighboring hardware node:
    where a given selected neighboring hardware node has not responded to the hardware node contacting the given selected neighboring hardware node to determine the corresponding level of cooperation of the given selected neighboring hardware node,
        storing within the cooperating list that the corresponding level of cooperation of the given selected neighboring hardware node is that the given selected neighboring hardware node is unresponsive.

10. A storage device storing computer-executable code executable by a hardware node to perform a method comprising:
    locating one or more neighboring hardware nodes;
    maintaining a general list of the neighboring hardware nodes;
    determining one or more selected neighboring hardware nodes within the general list with which the hardware node is interested in cooperating based on a desired functionality of the selected neighboring hardware nodes;
    after maintaining the general list, generating an interest list by the hardware node, the interest list including the selected neighboring hardware nodes within the general list with which the hardware node is interested in cooperating, the interest list being a subset of the general list;
    contacting each selected neighboring hardware node within the interest list to determine a corresponding level of cooperation of each selected neighboring hardware node; and
    after generating the interest list, generating a cooperating list after contacting each selected neighboring hardware node, the cooperating list including the corresponding level of cooperation of each selected neighboring hardware node, the cooperating list being a subset of the interest list, the cooperating list including one or more particular selected neighboring hardware nodes that have the desired functionality and that are willing to perform the desired functionality for the hardware node, wherein maintaining the general list of the neighboring hardware nodes comprises, for each neighboring hardware node:
  storing an identifier of the neighboring hardware node;
  storing a location of the neighboring hardware node;
  storing a function type of the neighboring hardware node; and
  storing additional data regarding the neighboring hardware node, the additional data related to the function type of the neighboring hardware node, and wherein determining the selected neighboring hardware nodes within the general list with which the hardware node is interested in cooperating comprises:
  filtering the general list of the neighboring hardware nodes to locate the selected neighboring hardware nodes based on one or more of the location and the function type of each neighboring hardware node.

11. The storage device of claim 10, wherein the method further comprises, after contacting each selected neighboring hardware node to determine the corresponding level of cooperation of each selected neighboring hardware node:
  receiving from a given selected neighboring hardware node the corresponding level of cooperation as one or more of:
    a list of one or more functions that the given selected neighboring hardware node is willing to perform for or with the hardware node;
    a cost in a currency that the given selected neighboring hardware unit is to charge for performing the functions;
    an exchange by which the given selected neighboring hardware unit is willing to perform the functions if the hardware node is willing to perform one or more other functions for the hardware node;
    that the given selected neighboring hardware node is unwilling to provide any level of cooperation.

12. The storage device of claim 10, wherein the method further comprises, after contacting each selected neighboring hardware node to determine the corresponding level of cooperation of each selected neighboring hardware node:
  where a given selected neighboring hardware node has not responded to the hardware node contacting the given selected neighboring hardware node to determine the corresponding level of cooperation of the given selected neighboring hardware node,
    storing within the cooperating list that the corresponding level of cooperation of the given selected neighboring hardware node is that the given selected neighboring hardware node is unresponsive.

13. A hardware node comprising:
  a hardware communication mechanism to communicate with one or more neighboring hardware nodes;
  a computer-readable data storage medium to store a general list of the neighboring hardware nodes, to store an interest list of one or more selected neighboring nodes with which the hardware node is interested in cooperating based on a desired functionality of the selected neighboring nodes, and to store a cooperating list of one or more particular selected neighboring hardware nodes that have the desired functionality and that are willing to perform the desired functionality for the hardware node, the interest list being a subset of the general list, the cooperating list being a subset of the interest list;
  first logic to locate the neighboring hardware nodes using the hardware communication mechanism and to responsively create the general list including, for each neighboring hardware node, by storing an identifier, a location, and a function type of the neighboring hardware node;
  second logic to, after the general list has been created, create the interest list based on the desired functionality of the selected neighboring nodes, including filtering the general list of the neighboring hardware nodes to locate the selected neighboring hardware nodes based on one or more of the location and the function type of each neighboring hardware node;
  third logic to, after the interest list has been created, determine the particular selected neighboring hardware nodes from the interest list, to contact each selected neighboring hardware node using the hardware communication mechanism to determine a corresponding level of cooperation of each selected neighboring hardware node, and to responsively generate the cooperating list such that the corresponding level of cooperation of each selected neighboring hardware node is stored within the cooperating list.

14. The hardware node of claim 13, wherein the corresponding level of cooperation of a given selected neighboring hardware node comprises one or more of:
  a list of one or more functions that the given selected neighboring hardware node is willing to perform for or with the hardware node;
  a cost in a currency that the given selected neighboring hardware unit is to charge for performing the functions;
  an exchange by which the given selected neighboring hardware unit is willing to perform the functions if the hardware node is willing to perform one or more other functions for the hardware node;
  that the given selected neighboring hardware node is unwilling to provide any level of cooperation.

* * * * *